(12) United States Patent
Wilkinson

(10) Patent No.: US 11,243,848 B2
(45) Date of Patent: Feb. 8, 2022

(54) MANAGING REMOTE DATA REPLICATION

(71) Applicant: International Business Machines Corporation, Armonk, NY (US)

(72) Inventor: John P. Wilkinson, Salisbury (GB)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 16/527,496

(22) Filed: Jul. 31, 2019

(65) Prior Publication Data

US 2019/0354445 A1 Nov. 21, 2019

Related U.S. Application Data

(63) Continuation of application No. 16/048,289, filed on Jul. 29, 2018, now Pat. No. 10,394,666, which is a
(Continued)

(51) Int. Cl.
*G06F 16/21* (2019.01)
*G06F 11/14* (2006.01)
*G06F 16/27* (2019.01)

(52) U.S. Cl.
CPC ...... *G06F 11/1464* (2013.01); *G06F 11/1458* (2013.01); *G06F 11/1469* (2013.01); *G06F 11/1471* (2013.01); *G06F 16/219* (2019.01); *G06F 16/278* (2019.01); *G06F 2201/84* (2013.01)

(58) Field of Classification Search
CPC ............. G06F 11/1469; G06F 11/1458; G06F 11/1471; G06F 16/219; G06F 16/278; G06F 2201/84; G06F 11/2064; G06F 11/2082; G06F 11/1464
See application file for complete search history.

(56) References Cited

U.S. PATENT DOCUMENTS 5,446,871 A * 8/1995 Shomler ............. G06F 11/2064
714/1
5,555,371 A * 9/1996 Duyanovich ....... G06F 11/2064
714/13
(Continued)

FOREIGN PATENT DOCUMENTS

CN 101567003 10/2009

OTHER PUBLICATIONS

Search Report; China Patent Application No. 201310001057.9; dated Jul. 28, 2015.
(Continued)

*Primary Examiner* — Merilyn P Nguyen
(74) *Attorney, Agent, or Firm* — Richard B. Thomas

(57) ABSTRACT

Various systems, processes, and products may be used to manage remote data replication. In particular implementations, a system and process for managing remote data replication may include the ability to store versions of a disk at a first site, a second site, and a third site. The version of the disk at the first site may store input/output for a host system, the version at the second site may be a synchronous replication of the version at the first site, and the third site may be an asynchronous replication of the version at the first site. The system and process may also include the ability to synchronize the version at the first site with the version at the third site if the second site is unavailable.

8 Claims, 11 Drawing Sheets

Related U.S. Application Data continuation of application No. 15/169,824, filed on Jun. 1, 2016, now Pat. No. 10,037,250, which is a continuation of application No. 15/169,812, filed on Jun. 1, 2016, now Pat. No. 10,037,249, which is a continuation of application No. 13/613,276, filed on Sep. 13, 2012, now Pat. No. 9,384,255, which is a continuation of application No. 13/343,691, filed on Jan. 4, 2012, now Pat. No. 9,372,910.

(56) References Cited

U.S. PATENT DOCUMENTS

| | | | |
|---|---|---|---|
| 5,937,414 | A | 8/1999 | Souder et al. |
| 6,016,553 | A * | 1/2000 | Schneider ............ G06F 11/1435 |
| | | | 714/21 |
| 6,209,002 | B1 | 3/2001 | Gagne et al. |
| 6,212,531 | B1 | 4/2001 | Blea et al. |
| 6,446,175 | B1 * | 9/2002 | West .................... G06F 11/1456 |
| | | | 711/161 |
| 6,529,944 | B1 | 3/2003 | Lecrone |
| 6,643,671 | B2 | 11/2003 | Milillo et al. |
| 6,697,960 | B1 * | 2/2004 | Clark ................... G06F 11/1469 |
| | | | 714/15 |
| 6,772,178 | B2 | 8/2004 | Mandal et al. |
| 6,957,221 | B1 * | 10/2005 | Hart ..................... G06F 11/2097 |
| 7,047,358 | B2 * | 5/2006 | Lee ...................... G06F 11/1076 |
| | | | 707/999.202 |
| 7,051,052 | B1 * | 5/2006 | Shapiro ................ G06F 11/2071 |
| | | | 707/610 |
| 7,055,059 | B2 | 5/2006 | Yanai et al. |
| 7,133,989 | B2 | 11/2006 | Burton et al. |
| 7,392,421 | B1 | 6/2008 | Bloomstein et al. |
| 7,603,529 | B1 | 10/2009 | Machardy et al. |
| 7,610,318 | B2 | 10/2009 | Bartfai et al. |
| 7,644,046 | B1 | 1/2010 | Keeton et al. |
| 7,653,668 | B1 | 1/2010 | Shelat et al. |
| 7,702,953 | B2 | 4/2010 | Spear et al. |
| 7,809,691 | B1 | 10/2010 | Karmarkar et al. |
| 7,937,547 | B2 * | 5/2011 | Liu ........................ G06F 12/16 |
| | | | 711/162 |
| 8,359,491 | B1 | 1/2013 | Bloomstein |
| 8,874,746 | B1 * | 10/2014 | Gonzalez ................ G06F 3/067 |
| | | | 709/226 |
| 9,032,160 | B1 | 5/2015 | Natanzon et al. |
| 9,785,523 | B2 | 10/2017 | Chiruvolu et al. |
| 2003/0014523 | A1 | 1/2003 | Teloh et al. |
| 2005/0044162 | A1 | 2/2005 | Liang et al. |
| 2005/0052921 | A1 * | 3/2005 | Butterworth ........ G06F 11/2066 |
| | | | 365/222 |
| 2006/0106893 | A1 * | 5/2006 | Daniels ............... G06F 11/1435 |
| 2006/0182020 | A1 | 8/2006 | Factor et al. |
| 2007/0022264 | A1 | 1/2007 | Bromling et al. |
| 2007/0143563 | A1 | 6/2007 | Pudipeddi et al. |
| 2007/0220311 | A1 | 9/2007 | Lewin et al. |
| 2007/0239944 | A1 | 10/2007 | Rupanagunta et al. |
| 2008/0178041 | A1 | 7/2008 | Takahashi et al. |
| 2009/0063575 | A1 | 3/2009 | Blea et al. |
| 2009/0204774 | A1 | 8/2009 | Matsui |
| 2010/0186014 | A1 | 7/2010 | Vaghani et al. |
| 2011/0022879 | A1 | 1/2011 | Chavda et al. |
| 2011/0047413 | A1 | 2/2011 | McGill et al. |
| 2011/0060722 | A1 * | 3/2011 | Li ......................... G06F 16/122 |
| | | | 707/649 |
| 2012/0079224 | A1 | 3/2012 | Clayton et al. |
| 2012/0158659 | A1 | 6/2012 | Marathe et al. |
| 2012/0324183 | A1 * | 12/2012 | Chiruvolu ........... G06F 11/2038 |
| | | | 711/162 |
| 2013/0103650 | A1 | 4/2013 | Natanzon et al. |

OTHER PUBLICATIONS

Office Action; China Patent Application No. 201310001057.9; dated Sep. 6, 2015.
Seshadri, Sangeetha, et al.; A Recovery Conscious Framework for Fault Resilient Storage Systems; smartech.gatech.edu; Georgia Institute of Technology; 2007.
International Business Machines Corporation; IBM System Storage DS8000 Series (on-line); retrieved from www-03.ibm.com/systems/storage/disk/ds8000/; retrieved on Aug. 22, 2011.
Bauer, Werner, et al.; IBM z/OS Metro/Global Mirror Incremental Resync; retrieved from www.redbooks.ibm; International Business Machines corporation; 2009.
Compellent; Remote Instant Replay—Storage Center Data Sheet; retrieved from https://www.google.com/?gws_rd=ssl#q=compellent+remote+instant+replay+storage+center+data+sheet; retrieved by at least Aug. 25, 2011.
Wikipedia; Replication (computing); online; retrieved from https://en.wikipedia.org/wiki/Replication_%28computing%29; retrieved by at least Nov. 4, 2011.
Wikipedia; Snapshot (computer storage); online; retrieved from https://en.wikipedia.org/wiki/Snapshot_%28computer_storage%29; retrieved by at least Oct. 12, 2011.

* cited by examiner

MANAGING REMOTE DATA REPLICATION

BACKGROUND

The present invention relates to managing computer data, and more specifically to managing data replication.

It is common for a storage system to have one or more of its disks backed up at a remote location to allow for disaster recovery. Most storage systems support simple point-to-point remote replication, from one source disk to one target disk, although some enterprise systems do support three-site replication. The replications may be performed in a synchronous or asynchronous manner.

In synchronous replication, the source storage system does not report completion of an operation (e.g., a write) until the target storage system has completed the operation. Thus, while guaranteeing an identical copy of a disk, this process is relatively slow and typically forces the target disk to be located relatively near the source disk.

In asynchronous replication, the source storage system can report completion of an operation before the target storage system has completed the operation (e.g., upon receiving notice that the target storage system has received the communication conveying the operation). Thus, this process is relatively fast and allows the target disk to be located farther away from the source disk, but does not guarantee an identical copy of the disk.

BRIEF SUMMARY

In one implementation, a process for managing remote data replication may include storing a version of a disk at a first site, storing a version of the disk at a second site that is remote from the first site, and storing a version of the disk at a third site that is remote from the first site and the second site. The version of the disk at the first site may store input/output for a host system, the version at the second site may be a synchronous replication of the version at the first site, and the third site may be an asynchronous replication of the version at the first site. The system and process may also include the ability to synchronize the version at the first site with the version at the third site if the second site is unavailable.

The details and features of various implementations will be conveyed by the following description, along with the drawings.

DETAILED DESCRIPTION

Figure 1:
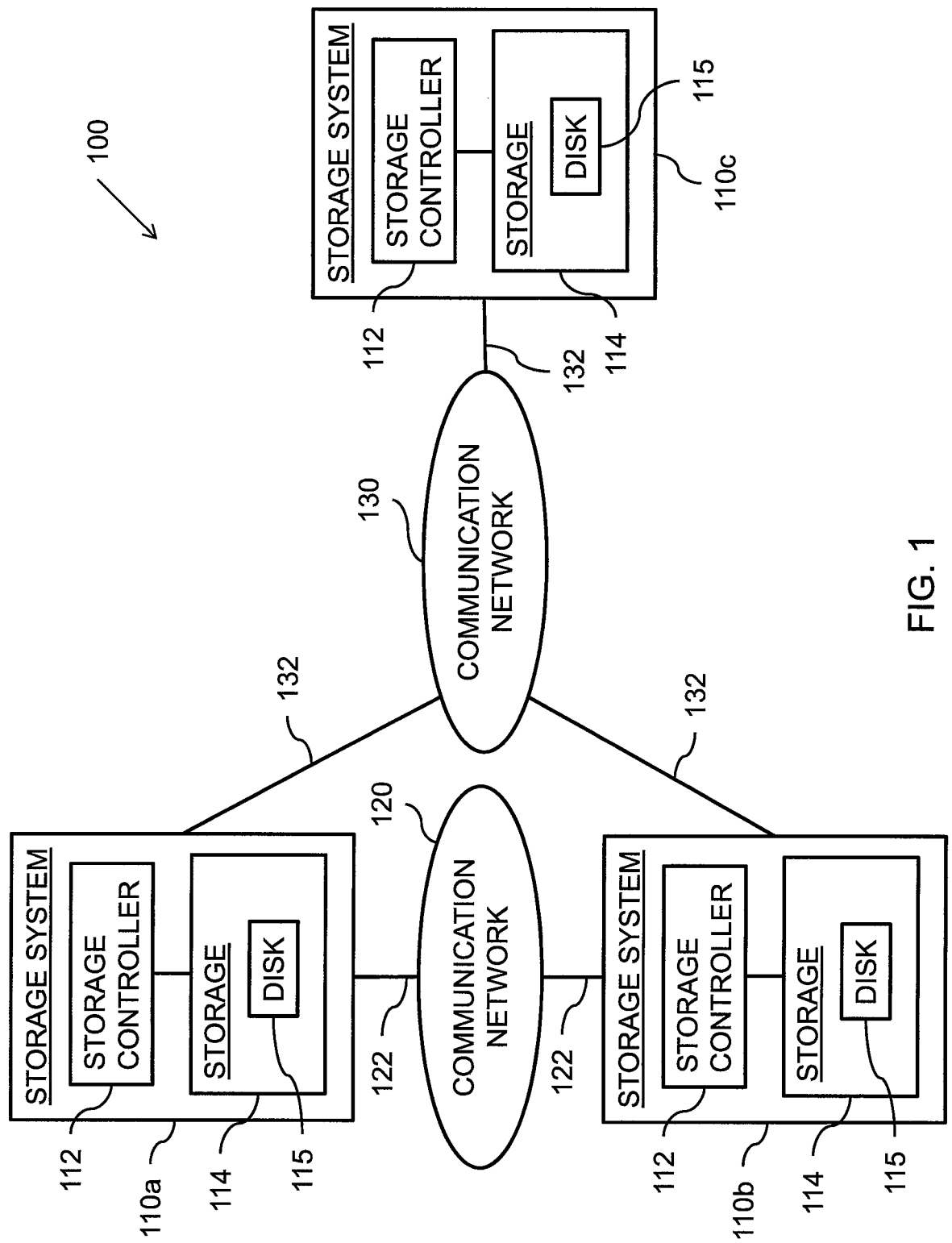
FIG. 1 is a block diagram illustrating an example system for managing remote replication of data.

Managing of remote data replication may be achieved by various techniques. In particular implementations, the management of remote data replication may include providing three sites, two of which are synchronously replicated to each other and one of which is asynchronously replicated from the first. Upon losing any one site, the other sites may continue to perform data storage functions. Moreover, the site that was lost may be resynchronized from either of the still operational sites. Thus, a robust system is provided.

As will be appreciated by one skilled in the art, aspects of the present disclosure may be implemented as a system, method, or computer program product. Accordingly, aspects of the present disclosure may take the form of an entirely hardware environment, an entirely software embodiment (including firmware, resident software, micro-code, etc.), or an implementation combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be a tangible medium that can contain or store a program for use by or in connection with an instruction execution system, apparatus, or device.

A computer readable signal medium may include a propagated data signal with computer readable program code embodied therein, for example in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any medium, including but not limited to wireless, wireline, optical fiber cable, RF, etc. or any suitable combination of the foregoing.

Computer program code for carrying out operations for aspects of the disclosure may be written in any combination of one or more programming languages such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described below with reference to flowchart illustrations and/or block diagrams of methods, apparatus (systems), and computer program products according to implementations. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart and/or block diagram block or blocks.

FIG. 1 illustrates an example system 100 for managing the remote replication of data. System 100 includes storage systems 110, a communication network 120, and a communication network 130.

Storage systems 110 may store data for various host systems (e.g., server systems running Advanced Interactive eXecutive (AIX) or Windows) that may be local or remote from the storage systems. In particular implementations, storage system 110a may provide the primary storage, and storage systems 110b-c may provide the backup storage. Storage systems 110 may, for example, include storage area networks, raid arrays, hard drives, tape drives, or any other device for storing data. Storage systems 110 may, for instance, store data in a block array, file system, database, or other appropriate format. Each of storage systems 110 includes a storage controller 112 and storage 114 (e.g., a hard disk, a tape, etc.).

Storage controllers 112 are responsible for actually placing data in storage 114. Additionally, storage controllers 112 coordinate with each other so that an operation (e.g., a write) at one of storage systems 110 is applied to the other storage systems 110. Each storage 114 includes a replica of a disk 115, which is an item that the storage systems are trying to be keep consistent between them. Disk 115 may be an actual disk in storage 114 or a representation of a disk in storage 114 (e.g. a virtualization).

A replication process basically keeps two disks consistent by updating a second disk with changes at a first disk as they occur. Replications between the disks may be in a synchronous or an asynchronous manner. A synchronous replication involves the second disk being updated in a contemporaneous manner as changes to the first disk occur. Thus, in most cases, the same data would be read from each disk at the same point in time. An asynchronous replication also involves the second disk being updated as changes to the first disk occur but not always in a contemporaneous manner. Thus, the data on the disks may be different for a period of time.

Note that although the techniques are described herein as being applicable to a single series of disks 115, storage systems 110 may have a number of disks that are being replicated between them, and the described techniques may be applied to any series of disks. For example, if storage system 110a has 100 disks being replicated to 100 disks of storage system 110b and storage system 110c, the following design can be applied to each set of disks individually.

Storage systems 110a-b are communicatively coupled to each other through communication network 120. Communication network 120 may, for example, be a local area network, a wide area network, or the Internet. Storage systems 110a-b are coupled to communication network 120 through communication links 122, which may include one or more wireline (e.g., cable or fiber optic) and/or wireless links (e.g., radio frequency).

Storage systems 110a-b are communicatively coupled to storage system 110c through communication network 130. Communication network 130 may, for example, be a local area network, a wide area network, or the Internet. Storage systems 110a-c are coupled to communication network 130 through communication links 132, which may include one or more wireline (e.g., cable or fiber optic) and/or wireless links (e.g., radio frequency).

In certain modes or operation, storage systems 110a-b operate in a synchronous manner for disk 115. Thus, when storage system 110a has data to write to disk 115, the host system will not receive successful completion until storage system 110b has committed the write. Additionally, storage system 110a-b and storage system 110c operate in an asynchronous manner for disk 115. That is, storage systems 110a-b may count a write as complete without having to wait for storage system 110c to commit the write.

As discussed previously, disks 115 are each on a separate storage systems 110. Each system may, for example, be running similar code on similar hardware. Disk 115a is the master copy to be replicated to disks 115b and 115c, so during normal operations, disk 115a is receiving writes from the host system. Disk 115b is typically at a relatively short distance from disk 115a. For example, disk 115b may be on the same campus or within about 100 km. As indicated above, the replication between disk 115a and disk 115b is synchronous, so the replication of disk 115a at disk 115b has a recovery point objective (RPO) of zero. For example, disk 115a and disk 115b can provide an environment suitable for automated storage failover such as that provided by GDPS™ HyperSwap from International Business Machines Corporation (IBM) of Armonk, N.Y. or GDDR AutoSwap from EMC Corporation (EMC) of Hopkinton, Mass.

Disk 115c is typically at a relatively large distance from both disk 115a and disk 115b. Thus, disk 115c may provide out-of-region disaster recovery. For example, disk 115c may be located at a distance in excess of 100 km from the other disks. As indicated previously, the replication between disk 115a and disk 115c and between disk 115b and disk 115c is asynchronous, so the replication of disk 115a at disk 115c and disk 115b at disk 115c has a non-zero RPO.

In some modes of operation, disk 115a and disk 115b are the source of asynchronous replications to disk 115c at different times. In particular, this may depend on which of disk 115a and disk 115b is currently available. In some implementations, the source of replication to disk 115c may move flexibly between disk 115a and disk 115b, depending whether a star or a cascade topology is used.

By sequencing of point-in-time copies and point-to-point replication, which will be discussed in more detail below, system 100 can achieve a three-site replication solution while being able to incrementally resynchronize between any two disks in the absence of the third. This allows a robust, complete solution made from a small number of building blocks.

System 100 has a variety of features. For example, data may be readily replicated to multiple locations, which may provide increased resilience or wide distribution of data (e.g., a golden image). In particular, system 100 provides local highly available redundant copies while still supporting disaster recovery at out-of-region distances. Many existing storage systems only support one target per host-accessible disk.

Although FIG. 1 illustrates one implementation of a system for remote data replication, other systems may include fewer, additional, and/or a different arrangement of components. For example, various other systems (e.g., server systems) may be co-located with one or more storage systems. As another example, communication network 120 and communication network 130 could be the same communication network (e.g., the Internet). Furthermore, disks 115 could be actual disks (e.g., hard drives).

Figure 2:
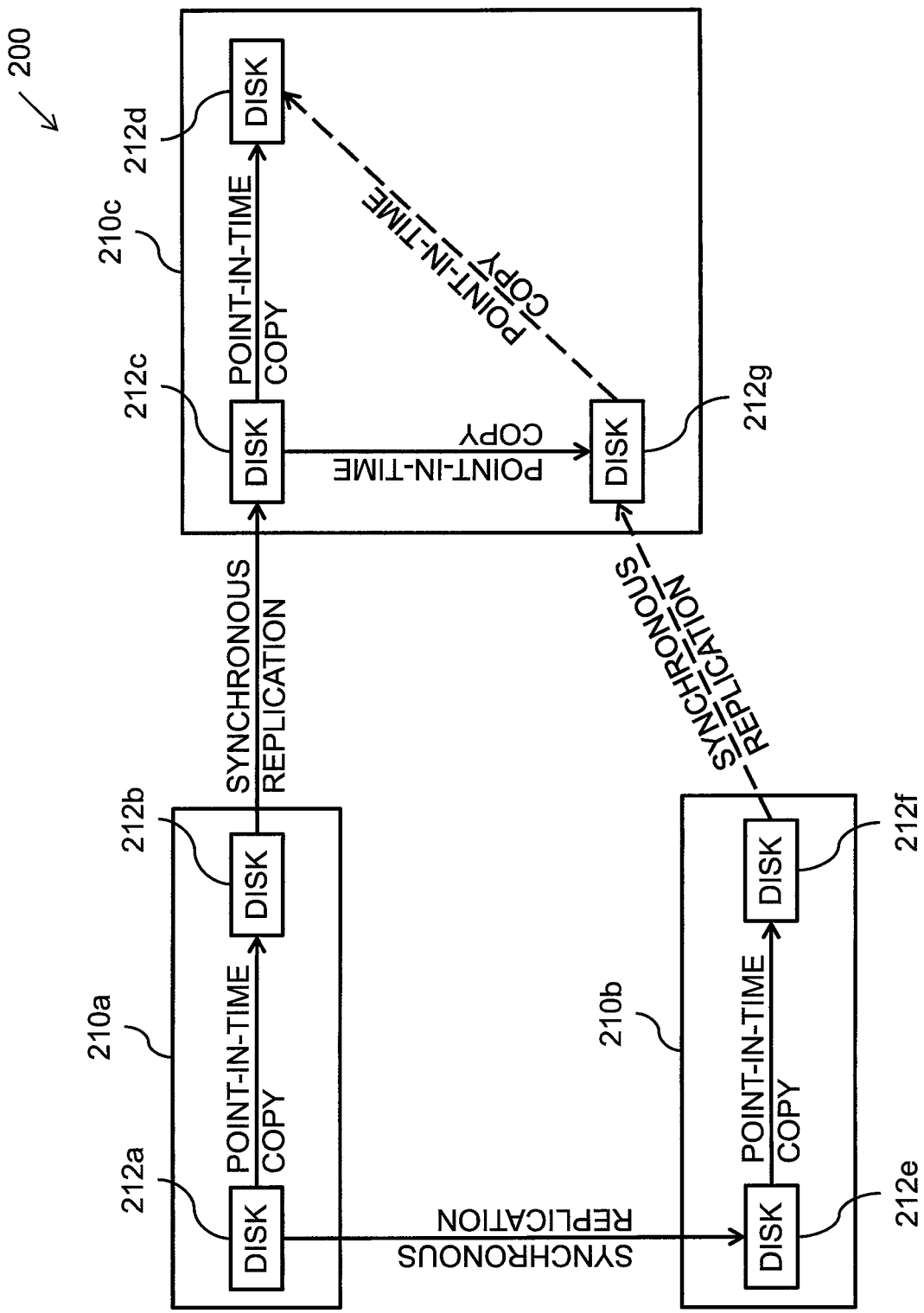
FIG. 2 is a block diagram illustrating an example configuration of a system for managing remote replication of data.

FIG. 2 illustrates an example system configuration 200 for managing remote data replication. System configuration 200 may, for example, be implemented by system 100. Note that system configure 200 generally shows the data flows for backing up disk 212a. However, the data flows may be reversed for various situations (e.g., resynchronizing a site that has been lost).

As illustrated, system configuration 200 includes a number of sites 210, each of which has a number of disks 212. Disk 212a is the main copy, and disks 212b-g are replicas of disk 212a, although they may have different versions of disk 212a at various times. It should be understood that disks 212 may not be actual disks, but representations of disks in storage. Each of sites 210 may be a separate storage system in a separate location.

As discussed in more detail below, system configuration 200 uses a number of point-in-time copies and synchronous replications. Some of the point-in-time copies are multiple-target, and the system configuration calls for both replicating a point-in-time copy and taking a point-in-time copy of a replication target. The system configuration may, for example, be implemented using a Storage Area Network (SAN) Volume Controller from IBM, which supports these features as of V6.2.

In certain modes of operation, assuming only disk 212a is in existence, disks 212b-g are then created (operation A1). Then, synchronous replications may be created but not started between disk 212a and disk 212e, disk 212b and disk 212c, and disk 212f and disk 212g (operation A2). Synchronous disk replications may, for example, be accomplished with Metro Mirror from IBM, Symmetrix Remote Data Facility (SRDF) from EMC Corporation, or TrueCopy from Hitachi Data Systems Corporation (HDS) of Santa Clara, Calif.

Additionally, point-in-time copies may be created but not started between disk 212a and disk 212b, disk 212e and disk 212f, disk 212c and disk 212g, and disk 212c and disk 212d (operation A3). Point-in-time copies may, for example, be accomplished with FlashCopy from IBM, TimeFinder/Clone from EMC, or ShadowImage from HDS. The point-in-time copies may be configured to perform no background copy.

Next, the synchronous replication between disk 212a and disk 212e is started (operation A4). This process may generally run throughout operations of system configuration 200. The process may, for example, be paused when on of disk 212a or disk 212e is unavailable.

After the synchronous replication between disk 212a and disk 212e has finished its initial copy (operation A5), the point-in-time copies of disk 212a to disk 212b and disk 212e to disk 212f may be triggered with respect to host system input/output (IO) (operation A6). This may involve quiescing host system IO. Disk 212b may, for example, be a logical copy of disk 212a. Then, the synchronous replication between disk 212b and disk 212c may be started (operation A7).

Once the synchronous replication between disk 212b and disk 212c has finished its initial copy, the replication is stopped (operation A8). Next, the point-in-time copies from disk 212c to disk 212d and from disk 212c to disk 212g is triggered (operation A9). The relative timing of these copies is typically unimportant. After this, consistent images exist on disk 212a, disk 212e, and disk 212d, although disk 212d will probably have an older image than disk 212a and disk 212e. In certain implementations, disk 212d may have historical images of disk 212a.

In particular modes of operation, disk 212d may be the master disk if disk 212a and disk 212e are unavailable. The failover between disk 212a or disk 212e to disk 212d is similar to the failover between disk 212a and disk 212e, except that that the failover is more involved as all data since the start of the previous cycle will be lost by failing over to disk 212d. Thus, this transition is not transparent. This is a common problem with asynchronous replication solutions and is typically managed by the host applications using such storage systems.

Then, the replication between disk 212f and disk 212g, which is not currently running, may be cleaned (operation A10). Replications may exist but not run. A replication that is running (e.g., has been started) will attempt to replicate the data according to the configured requirements. For example, a synchronous replication may attempt to replicate data immediately, but an asynchronous replication may replicate after a delay. A replication that exists but is not running (e.g., has not been started or has been stopped) will not attempt to replicate the data, but it typically records which regions have been changed, so that when started, it can resynchronize those regions. Using this feature of replication technology, the changes to disk 212f caused by the triggering of the point-in-time copy from disk 212e are recorded by the replication disk between 212f and disk 212g, which dirties the stopped replication. This recording is cumulative, and so for each cycle, even though the replication between disk 212f and disk 212g has not started, the replication should be cleaned.

Cleaning the replication between disk 212f and disk 212g may, for example, be accomplished by deleting the synchronous replication and recreating it in a clean state (i.e. one where if the replication were started at that point, it would not attempt to resynchronize disk 212f and disk 212g with data that has already replicated through disk 212a to disk 212b, disk 212b to disk 212c, and disk 212c to disk 212g). This is commonly referred to as a NOCOPY creation, and is supported by various products, such as DS8000 from IBM and XP Continuous Access from Hewlett-Packard Company of Palo Alto, Calif. Other techniques may also be used to clean the replication. For instance, it may be possible to directly instruct the system to discard all differences recorded between disk 212*f* and disk 212*g*.

After this, the point-in-time copies from disk 212*a* to disk 212*b* and from disk 212*e* to disk 212*f* may be retriggered (operation A11). This dirties the replications from disk 212*b* to disk 212*c* and from disk 212*f* to disk 212*g* on the regions that have been updated by retriggering the point-in-time copies. The process may then be repeated beginning at operation A7.

The cycle from operation A7 to operation A12 can run as fast as the synchronous replication can complete copying the changes and the other commands can be run. As the length of time that the replication copying takes is proportional to the number of writes written to disk 212*a* in the previous cycle, while the rate of writes written is less than the replication copying rate, the cycle period (and hence the RPO) can tend towards zero. And while the rate of writes is greater than the replication copying rate, the cycle period and the RPO will grow. This allows the system to cope with significant spikes in write rates.

If site 210*a* is lost, system configuration 200 can fail host system IO over to site 210*b* using the disk 212*a* to disk 212*e* replication. Thus, host system IO is now being written to disk 212*e*. The fail over determination may, for example, be accomplished by a high-availability solution such as Hyperswap or PowerHA from IBM. The high-availability solution may be co-located with the storage systems or the host systems.

High-availability solutions tend to be configured to play a relatively passive role, where they observe the loss of a site and reconfigure the host systems to access another replica directly or drive a host-level failover to a host system that can access another replica (the details of which would be specific to the host type). High-availability solutions would typically have the connectivity and knowledge of availability needed for performing the sequencing actions (e.g., synchronizations and point-in-time copies) discussed previously. However, the sequencing actions need not be co-located with a high-availability solution.

Except if the process has been performing operations A7-A10, the process continues with triggering the point-in-time copy from disk 212*e* to disk 212*f* (operation B1), which is similar to operations A6/A11. The process also calls for starting the synchronous replication from disk 212*f* to disk 212*g* (operation B2), which is similar to operation A7, and then waiting for the synchronous replication from disk 212*f* to disk 212*g* to finish its copy of changed data and stopping it (operation B3), which is similar to operation A8. After this, a point-in-time copy from disk 212*g* to disk 212*d* may be triggered (operation B4), which is similar to operation A9. The cycle of operations B1-B4 may be repeated until site 210*a* returns.

If the process had been performing operation A7 or operation A8 when site 1 was lost, the process calls for starting at operation B2, as disk 212*f* already contains the data needed to copy for this cycle. If site 1 was lost during operation A9, the process calls for performing operation A10 (i.e., cleaning the F to G synchronization) and starting from operation B4. If site 1 was lost during operation A10, the process calls for performing operation A10, then starting from operation B1.

A difference recording in the stopped replication from disk 212*e* to disk 212*a* while the process cycles through operations B1-B3 may allow site 210*a* to be incrementally resynchronized when it returns. As disk 212*c* remains static while the B1-B3 operation cycle occurs, the differences recorded by the point-in-time copy from disk 212*c* to disk 212*d* allows incremental resynchronization of site 210*a* from site 210*c* in the absence of site 210*b* by first reversing the direction and starting the point-in-time copy between disk 212*c* and disk 212*d*, such that disk 212*c* is modified to match disk 212*d*. The changes this makes to disk 212*c* may be recorded in the difference recording of the synchronous replication between disk 212*b* and disk 212*c*, such that that replication can be restarted from disk 212*c* to disk 212*b* and will copy only the necessary regions to resynchronize site 210*a*. Reversing the direction and starting the point-in-time copy between disk 212*a* and disk 212*b* to copy the changes on disk 212*b* to disk 212*a* will complete the restoration of site 210*a*.

When site 210*a* returns, the synchronous replication between disk 212*e* and disk 212*a* may be restarted, although in the reverse direction from before (operation C1). After the incremental resynchronization of the synchronous replication from disk 212*e* to disk 212*a* is complete (operation C2), the process may wait for the current copy from disk 212*f* to disk 212*g* to complete (operation C3). Then, the point-in-time copy from disk 212*g* to disk 212*d* may be triggered (in the reverse direction) (operation C4), and the point-in-time copy from disk 212*g* to disk 212*c* may be triggered (again in the reverse direction) (operation C5). The disk 212*c* to disk 212*d* replication may then be cleaned as in operation A10 (operation C6), and the main sequence may be started from A11 (operation C7).

At this point, the process may fail back to the host system IO being received on disk 212*a* by stopping the disk 212*e* to disk 212*a* replication and restarting it in the disk 212*a* to disk 212*e* direction. However, this is not required.

If site 210*b* is lost, the host system IO may continue being written to disk 212*a*, and the main cycle (i.e., operations A7-A11) may continue, except that nothing on site 210*b* may be manipulated, and the disk 212*c* to disk 212*g* point-in-time copy is not triggered. Thus, disk 212*g* may maintain an older copy of disk 212*c*. The synchronous replication from disk 212*a* to disk 212*e* is automatically stopped due to the loss of site 2.

The difference recording in the stopped replication from disk 212*a* to disk 212*e* allows site 210*b* to be incrementally resynchronized when it returns. As disk 212*g* remains static, the differences recorded by the point-in-time copy from disk 212*g* to disk 212*d* would also allow incremental resynchronization of site 210*b* from site 210*c* in the absence of site 210*a*.

When site 210*b* returns, the replication from disk 212*a* to disk 212*e* is restarted. When that replication is complete, and the main cycle completes operation A8, the process may continue from operation A9 fully including site 210*b* (such as retriggering the disk 210*c* to 210*g* point-in-time copy).

If site 210*c* is lost, operations A7-A11 are paused, and the process waits for site 210*c* to return. When it does, the process can continue from the operation it was previously at. If site 210*a* is not available, however, site 210*c* may be resynchronized from site 210*b*.

System configuration 200 allows replication to two remote sites that have differing replication characteristics, with simple and fast resynchronization when losing any one site. System configuration 200 also provides the ability to continue working in the absence of any copy by incrementally resynchronizing between the remaining copies. Additionally when the site returns, it may be resynchronized to either of the other two sites, so the system configuration can easily cope with a rolling failure that impacts multiple locations at overlapping times. Some enterprise systems support three-site replication, but prevent incremental resynchronization between a pair of disks (e.g., disk 212a and disk 212d or disk 212e and disk 212d), which makes the systems significantly less robust when a site is inaccessible.

Figure 3:
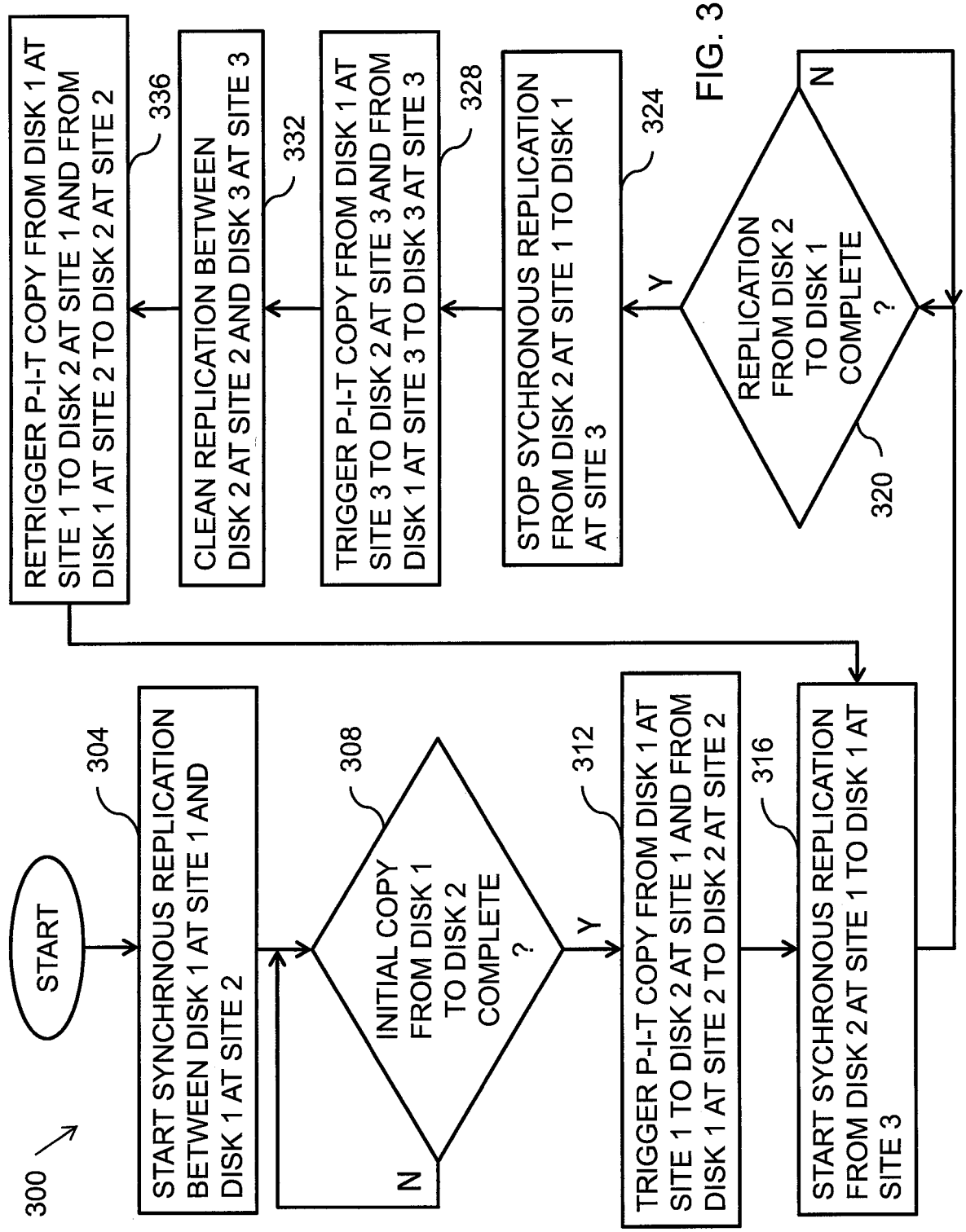
FIG. 3 is a flowchart illustrating an example process for managing remote replication of data.
Figure 4A:
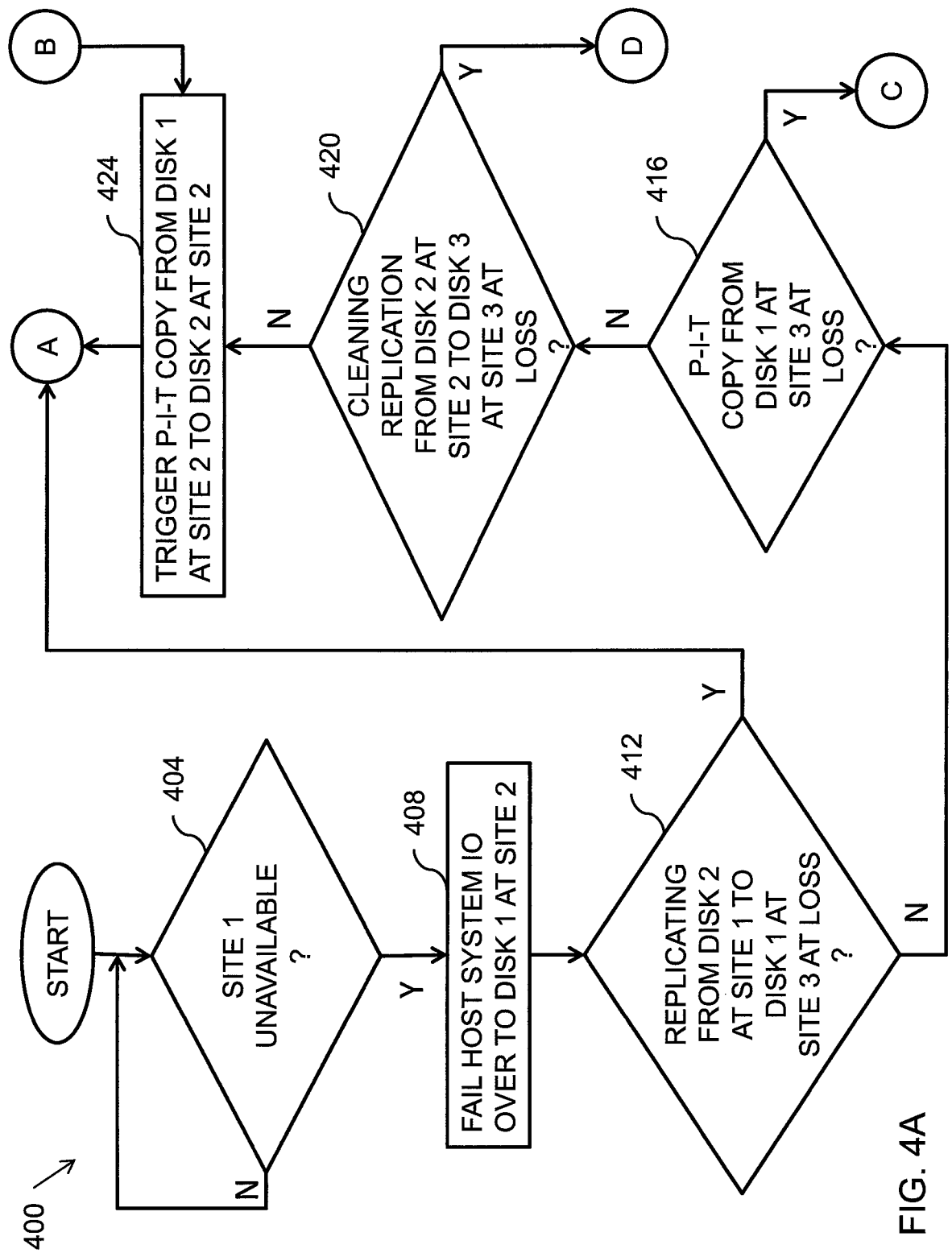
FIGS. 4A-D are a flowchart illustrating another example process for managing remote replication of data.
Figure 4B:
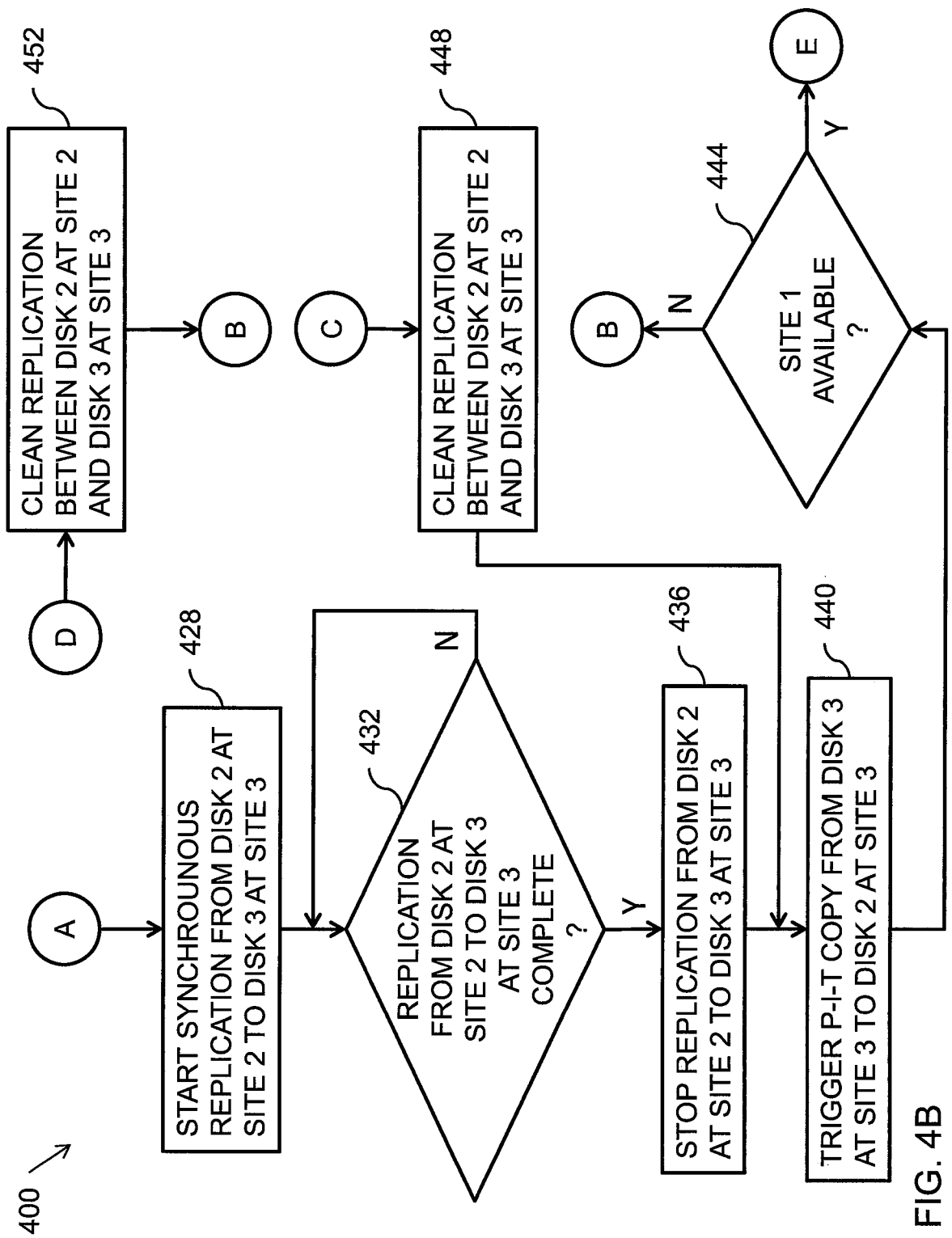
Figure 4C:
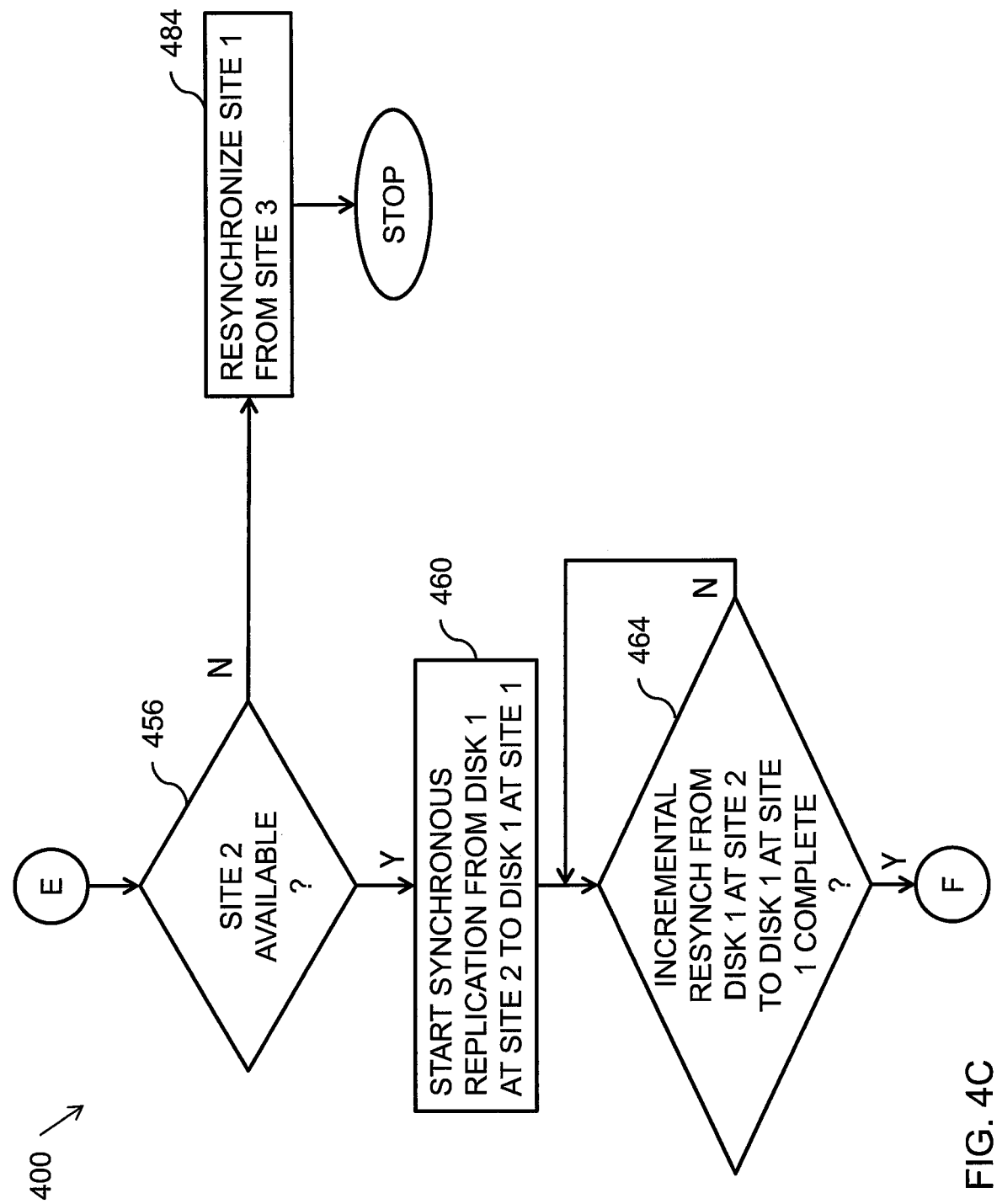
Figure 4D:
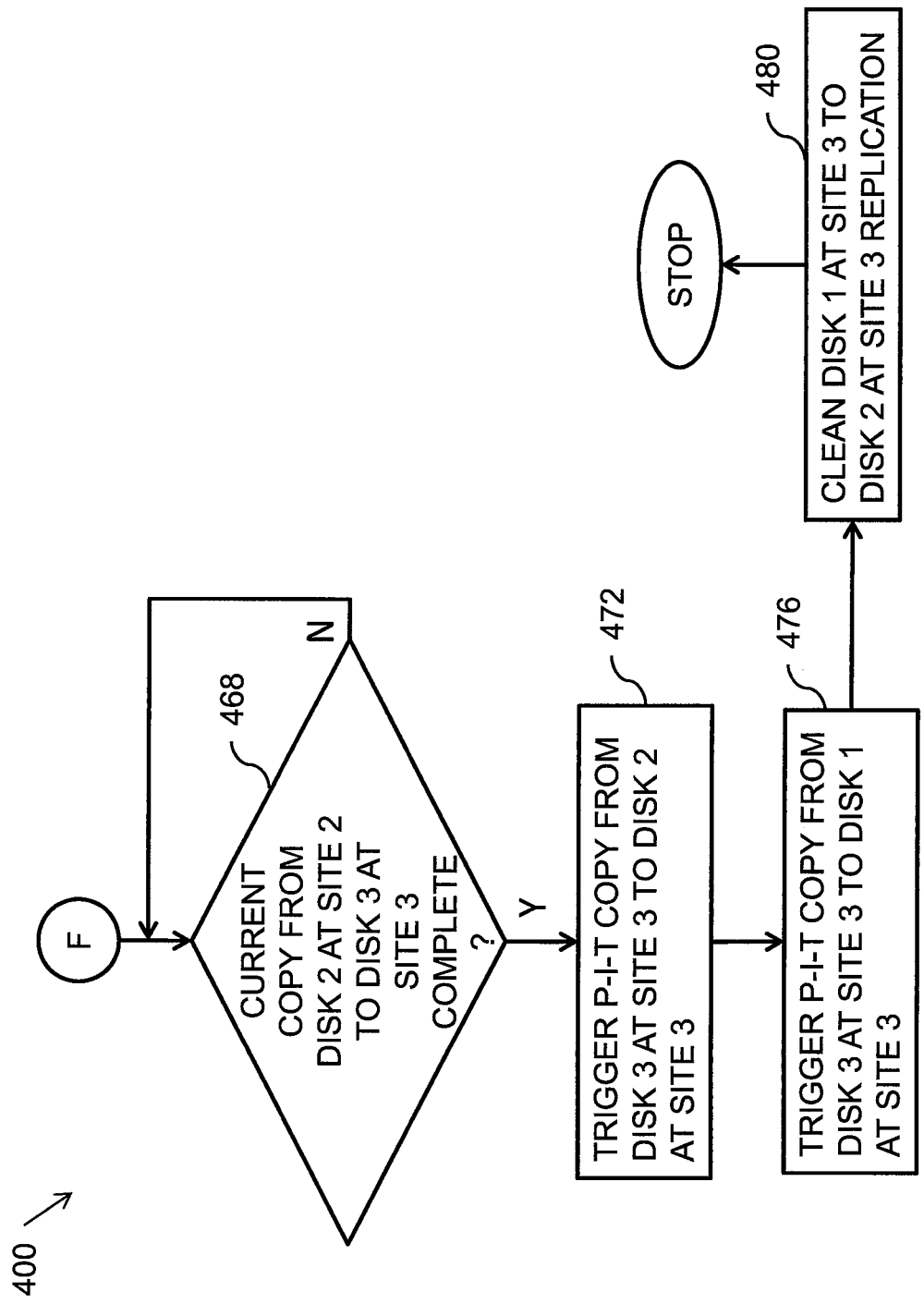

FIG. 3 illustrates an example process 300 for managing the remote replication of data. Process 300 may, for example, be performed by a system similar to system 100. Additionally, the implementing system may have a configuration similar to system configuration 200.

In this example, process 300 is working with three sites (e.g., site 1, site 2, and site 3) that have copies of a disk, which may be a physical disk or a representation thereof. Each site also has multiple copies of the disk. A first disk at site 1 is the main copy of the disk, and a first disk at site 2 is synchronously replicated from the first disk at site 1 and serves as its primary backup. Site 3 provides an asynchronous backup the disks at sites 1 and 2. Each site may, for example, be a separate storage system in a separate location.

Process 300 calls for starting a synchronous replication between the first disk at site 1 and the first disk at site 2 (operation 304). This replication may generally run throughout process 300. But there are instances (e.g., when one of the disks is unavailable) when this replication will not be running. Process 300 then calls for waiting for the initial copy between these disks to complete (operation 308).

Once the initial copy is complete, process 300 calls for triggering point-in-time copies from the first disk at site 1 to a second disk at site 1 and from the first disk at site 2 to a second disk at site 2 with respect to host system input/output (IO) (operation 312). This may involve quiescing host system IO. Process 300 also calls for starting a synchronous replication from the second disk at site 1 to a first disk at site 3 (operation 316) and checking if the replication between the disks is complete (operation 320). If the replication is not complete, process 300 calls for waiting for the replication to complete.

Once the synchronous replication between the second disk at site 1 and the first at site 3 has finished its initial copy, process 300 calls for stopping the replication (operation 324). Process 300 then calls for triggering point-in-time copies from the first disk at site 3 to a second disk at site 3 and from the first disk at site 3 to a third disk at site 3 (operation 328). The relative timing of these copies is typically unimportant. After this, consistent images exist on the first disk at site 1, the first disk at site 2, and the second disk at site 3, although the last will probably have an older image than the others.

Process 300 also calls for cleaning the replication between the second disk at site 2 and the third disk at site 3 (operation 332). A synchronous replication from the second disk at site 2 to the third disk at site 3 would be dirty, which means that the replication thinks it needs to copy lots of data. However, all the work has been performed by operations 316-328. Thus, the synchronization only needs to be cleaned. This may, for example, be accomplished by deleting the synchronous replication and recreating it clean, which is commonly referred to a NOCOPY creation.

Process 300 then calls for retriggering the point-in time copies from the first disk at site 1 to the second disk at site 1 and from the first disk at site 2 to the second disk at site 2 (operation 336). This dirties the replications from the second disk at site 1 to the first disk at site 3 and from the second disk at site 2 to the third disk at site 3 on the regions that have been updated by retriggering the point-in-time copies. Process 300 then calls for restarting the synchronous replication from the second disk at site 1 to the first disk at site 3 (operation 316).

The cycle from operation 316 to operation 336 can run as fast as the synchronous replication can complete copying the changes and the other commands can be run. As the length of time that the replication copying takes is proportional to the number of writes written to the first disk at site 1 in the previous cycle, while the rate of writes written is less than the replication copying rate, the cycle period (and hence the RPO) can tend towards zero. And while the rate of writes is greater than the replication copying rate, the cycle period and the RPO will grow. This allows the system to cope with significant spikes in write rates.

This cycle generally runs as long as the sites are operating normally. Thus, the cycle can be repeated a large number of times during normal operations. When one or the sites becomes unavailable, however, one or more operations of the cycle may be stopped for a period of time (e.g., until the lost site returns).

FIGS. 4A-D illustrate another example process 400 for managing the remote replication of data. Process 400 may, for example, be implemented in conjunction with process 300, which may be paused while parts of process 400 are running.

Process 400 calls for determining whether site 1 is unavailable (operation 404). Site 1 may, for example, be lost due to a power failure, a communication failure, or a hardware failure. If site 1 has not been lost, process 400 calls for continuing to check whether site 1 has been lost.

Once site 1 is unavailable, process 400 calls for failing host system IO over to site 2 (operation 408). This may, for example, be accomplished using the replication from the first disk at site 1 to the first disk at site 2, which ensures that at the point at which site 1 is unavailable, the first disk at site 2 already contains the same data as the first disk at site 1. Thus, the host system IO may be failed over transparently by a high-availability solution. Thus, host system IO system is now being written to the first disk at site 2.

Process 400 also calls for determining if operations 316-320 (i.e., replicating the data from the second disk at site 1 to the first disk at site 2) were being performed at the loss of site 1 (operation 412). If operations 316-320 were being performed, the third disk at site 3 will contain a consistent image of what the first disk at site 3 was at the beginning of the cycle.

If a replication from the second disk at site 1 to the first disk at site 2 was not being performed, process 400 calls for determining whether a point-in-time copy from the first disk at site 3 was being performed at the loss of site 1 (operation 416). If a point-in-time copy from the first disk at site 3 was not being performed at the loss, process 400 calls for determining whether a cleaning of the replication from the second disk at site 2 to the third disk at site 3 was being performed at the loss of site 1 (operation 420).

If a cleaning of the replication from the second disk at site 2 to the third disk at site 3 was not being performed, process 400 calls for triggering a point-in-time copy from the first disk at site 2 to the second disk at site 2 (operation 424). Process 400 also calls starting the synchronous replication from the second disk at site 2 to the third disk at site 3 (operation 428). Process 400 additionally calls for determining whether the synchronous replication from the second disk at site 2 to the third disk at site 3 has finished its copy of changed data (operation 432). Once this synchronous replication has finished its copy of changed data, process 400 calls for stopping the replication (operation 436).

Process 400 also calls for triggering the point-in-time copy from the third disk at site 3 to the disk second disk at site 3 (operation 440). Process 400 continues with determine whether site 1 is available (operation 444). If site 1 is not available, process 400 calls for returning to operation 424. The cycle of operations 424-444 may be repeated until site 1 returns. The difference recording in the stopped replication from the first disk 1 at site 2 to the first disk at site 1 while the process cycles through operations 424-444 allows site 1 to be incrementally resynchronized when it returns.

Returning to operation 412, if a replication from the second disk at site 1 to the first disk at site 2 was being performed at the loss of site 1, process 400 calls for starting the replication from the second disk at site 2 to the third disk at site 3 (operation 428). Process 400 may then continue from operation 428 as described above.

Returning to operation 416, if a point-in-time copy from the first disk at site 3 was being performed at the loss of site 1, process 400 calls for cleaning the replication between the second disk at site 2 and the third disk at site 3 (operation 448). Process 400 may then continue from operation 440.

Returning to operation 420, if a cleaning of the replication between the second disk at site 2 and the third disk at site 3 was being performed at the loss of site 1, process 400 calls for cleaning the replication between the second disk at site 2 and the third disk at site 3 (operation 452). Process 400 may then continue from operation 424.

When site 1 becomes available, process 400 calls for determining whether site 2 is available (operation 456). If site 2 is available, process 400 calls for restarting the synchronous replication between the first disk at site 2 and the first disk at site 1, although in the reverse direction from before (operation 460). Process 400 also calls for determining whether the incremental resynchronization between these disks is complete (operation 464). If the incremental resynchronization is not complete, process 400 calls for waiting for it to complete.

Once the incremental resynchronization of the synchronous replication from the first disk at site 2 to the first disk at site 1 is complete, process 400 calls for determining whether the current copy from the second disk of site 2 to the third disk of site 3 is complete (operation 468). If the current copy from the second disk of site 2 to the third disk of site 3 is not complete, process 400 calls for waiting for it to complete.

Once the current copy from the second disk of site 2 to the third disk of site 3 is complete, process 400 calls for triggering the point-in-time copy from the third disk at site 3 to the second disk at site 3 (operation 472) and triggering the point-in-time copy from the third disk at site 3 to the first disk at site 3 (the reverse direction) (operation 476). The replication between the first disk at site 3 and the second disk at site 3 may then be cleaned (operation 480). This replication may be dirty, which means that the replication thinks it needs to copy lots of data. However, all the work has been performed by operations 468-476. Thus, only the replication needs to be cleaned. This may, for example, be accomplished by deleting the replication and recreating it clean.

Process 400 is then at an end. Process 300 may, for example, then be restarted from operation 336. Additionally, the host system IO may again be received on disk the first disk of site 1 by stopping the first disk at site 2 to the first disk at site 1 replication and restarting it in the other direction. However, this is not required.

Returning to operation 456, if site 2 is not available, process 400 calls for resynchronizing site 1 from site 3 (operation 484). For example, since the first disk of site 3 remains static while site 1 is unavailable, the differences recorded by the point-in-time copy from the first disk at site 3 to the second disk at site 3 allows incrementally resynchronizing site 1 from site 3. Process 400 is then at an end. Process 300 may, for example, then be restarted from operation 336. Additionally, the host system IO may again be received on the first disk of site 1.

Figure 5A:
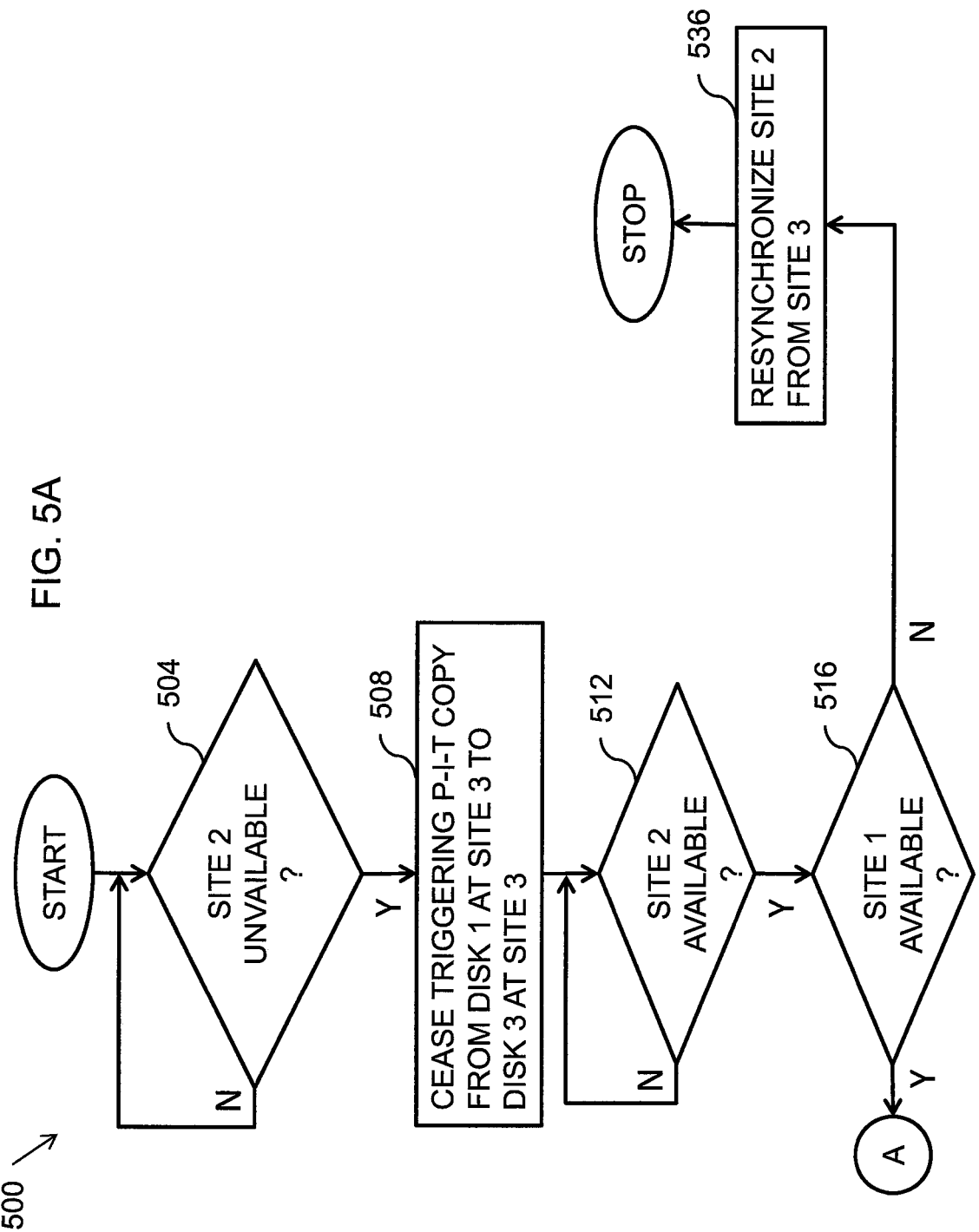
FIGS. 5A-B are a flowchart illustrating an additional example process for managing remote replication of data.
Figure 5B:
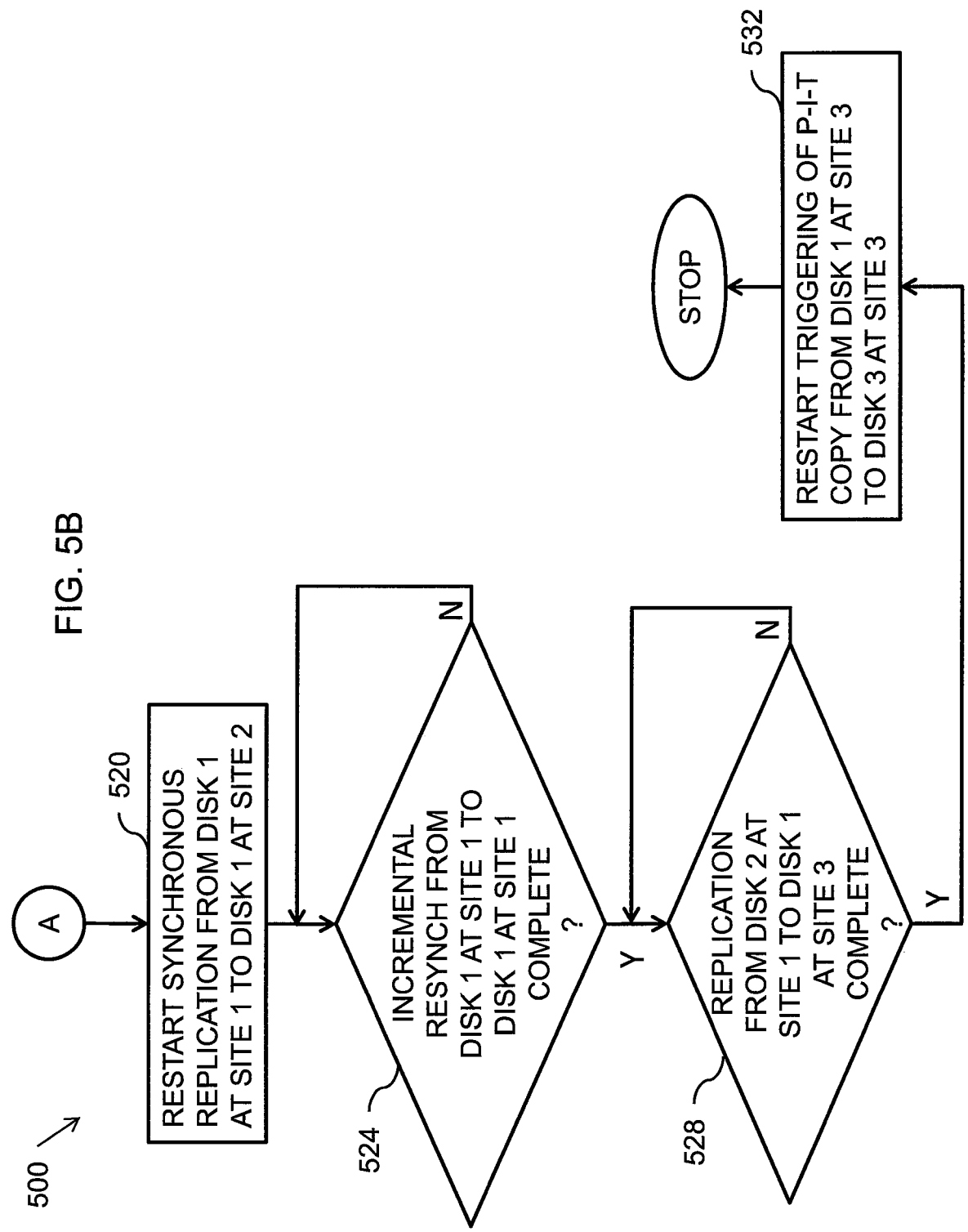

FIGS. 5A-B illustrate another example process 500 for managing the remote replication of data. Process 500 may, for example, be implemented in conjunction with process 300.

Process 500 calls for determining whether site 2 is unavailable (operation 504). Site 2 may, for example, be lost due to a power failure, a communication failure, or a hardware failure. If site 2 has not been lost, process 500 calls for continuing to check whether site 2 has been lost.

Once site 2 unavailable, process 500 calls for ceasing to trigger the point-in-time copy from the first disk at site 3 to the third disk at site 3 (operation 508). Thus, the host system IO may continue being written to the first disk at site 1, and the main cycle of process 300 (i.e., operations 316-336) may continue, except that nothing on site 2 may be manipulated.

Process 500 then calls for determining whether site 2 is available (operation 512). If site 2 is not available, process 500 calls for waiting for it to become available. During this time, the difference recording in the stopped replication from the first disk of site 1 to the first disk of site 2 allows site 2 to be incrementally resynchronized when it returns.

When site 2 is available, process 500 calls for determining whether site 1 is available (operation 516). If site 1 is available, process 500 calls for restarting the synchronous replication from the first disk of site 1 to the first disk of site 2 (operation 520). Process 500 also calls for determining whether the resynchronization between these disks is complete (operation 524). If the resynchronization is not complete, process 500 waits for the resynchronization to complete.

Once the resynchronization is complete, process 500 calls for determining whether the replication from the second disk at site 1 to the first disk at site 3 is complete (operation 528). If this replication is not complete, process 500 waits for the replication to complete. Once the replication is complete, process 500 calls for restarting the trigger of the point-in-time copy from the first disk at site 3 to the third disk at site 3 (operation 532). Process 500 is then at an end, and process 300 can resume its normal operations beginning at operation 328.

If, however, site 1 is not available, process 500 calls for resynchronizing site 2 from site 3 (operation 536). For example, since the third disk at site 3 remains static, the differences recorded by the point-in-time copy from this disk to the second disk at site 3 allow incremental resynchronization of site 2 from site 3. Process 500 is then at an end, and process 300 can resume its normal operations beginning at operation 328.

Figure 6:
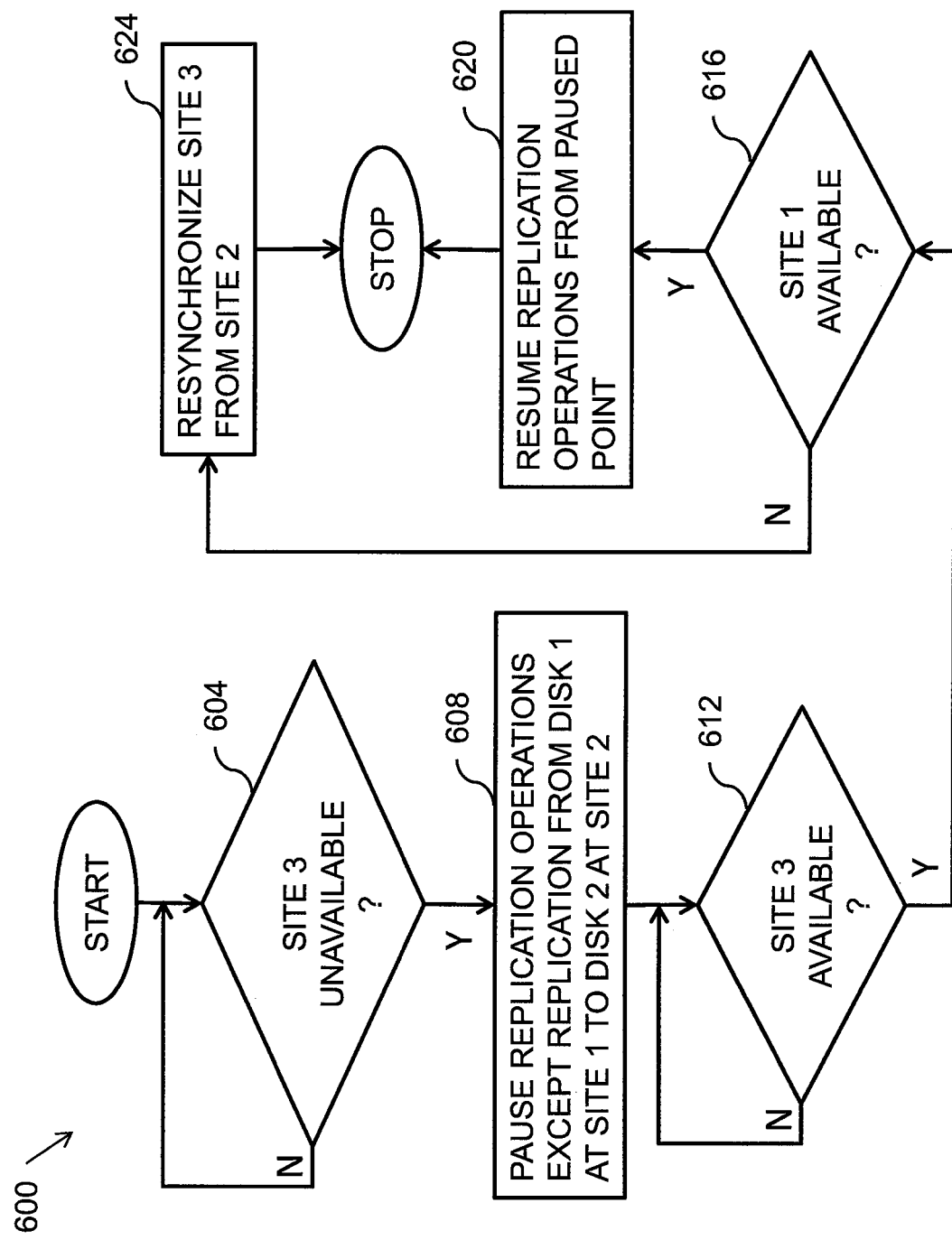
FIG. 6 is a flowchart illustrating a further example process for managing remote replication of data.

FIG. 6 illustrates another example process 600 for managing the remote replication of data. Process 600 may, for example, be implemented in conjunction with process 300.

Process 600 calls for determining whether site 3 is unavailable (operation 604). Site 3 may, for example, be lost due to a power failure, a communication failure, or a hardware failure. If site 3 is not unavailable, process 600 calls for continuing to check whether site 3 is unavailable.

If site 3 becomes unavailable, process 600 calls for pausing replication operations except for the synchronous replication from the first disk at site 1 to the first disk at site 2 (e.g., operations 316-336) (operation 608). Process 600 also calls for determining whether site 3 has become available (operation 612). If site 3 is not available, process 600 calls for waiting for it to become available.

When site 3 is available, process 600 calls for determining whether site 1 is available (operation 612). If site 1 is available, process 600 calls for resuming replication operations from the paused point (operation 616). Process 600 is then at an end, and process 300 may resume operation.

If, however, site 1 is not available, process 600 calls for resynchronizing site 3 from site 2 (operation 620). This may, for example, be accomplished use operations 428-440 from process 400. Process 600 is then at an end, and process 300 may resume operation.

The flowchart and block diagrams in the figures illustrate the architecture, functionality, and operation of systems, methods, and computer program products of various implementations of the disclosure. In this regard, each block in the flowchart or block diagrams may represent a module, segment, or portion of code, which can include one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or the flowchart illustration, and combination of blocks in the block diagrams and/or flowchart illustration, can be implemented by special purpose hardware-based systems the perform the specified function or acts, or combinations of special purpose hardware and computer instructions.

Figure 7:
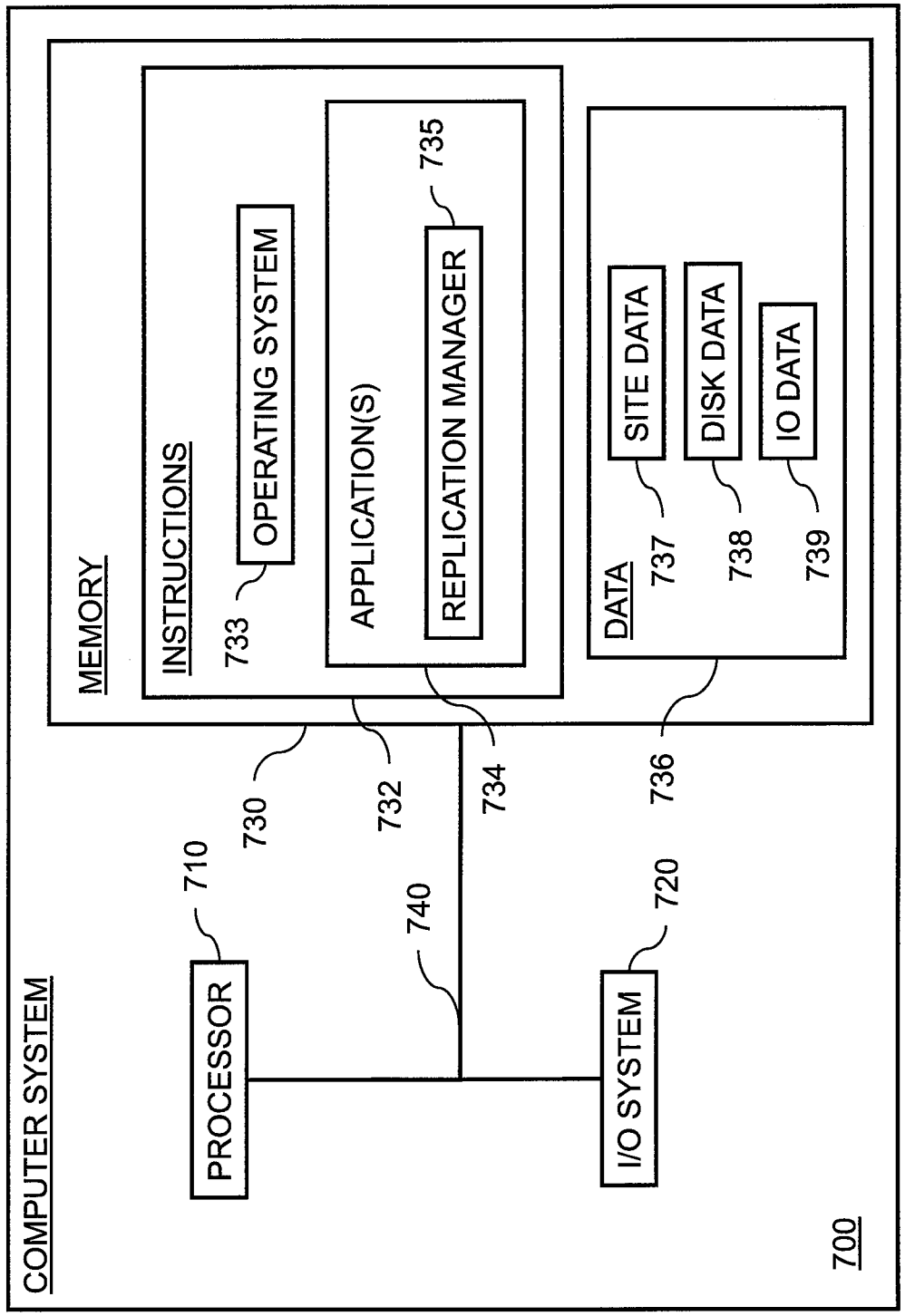
FIG. 7 is a block diagram illustrating an example computer system for managing remote replication of data.

FIG. 7 illustrates an example computer system 700 for managing the remote replication of data. Computer system 700 may, for example, illustrate some of the components of a storage controller of a storage system.

System 700 includes a processor 710, an input/output system 720, and memory 730, which are coupled together by a network 740. As illustrated, computer system 700 is functioning as a storage controller of a storage system.

Processor 710 typically includes a logical processing unit (e.g., an arithmetic logic unit) that processes data under the direction of program instructions (e.g., from software). For example, processor 710 may be a microprocessor, a microcontroller, or an application specific integrated circuit. The processor may operate by reduced instruction set computer (RISC) or complex instruction set computer (CISC) principles. In general, the processor may be any device that manipulates data in a logical manner.

Input/output system 720 may include one or more communication interfaces and/or one or more other user interfaces. A communication interface may, for instance, be a network interface card (whether wireless or wireless) or a modem. A user interface could, for instance, be a user input device (e.g., a keyboard, a keypad, a touchpad, a stylus, or a microphone) or a user output device (e.g., a monitor, a display, or a speaker). In general, system 720 may be any combination of devices by which a computer system can receive and output data.

Memory 730 may, for example, include random access memory (RAM), read-only memory (ROM), flash memory, and/or disc memory. Various items may be stored in different portions of the memory at various times. Memory 730, in general, may be any combination of devices for storing data.

Memory 730 includes instructions 732 and data 736. Instructions 732 include an operating system 733 (e.g., Windows, Linux, or Unix) and applications 734, which include a replication management program 735. Data 736 includes the data required for and/or produced by applications 734, including site data 737, disk data 738, and write data 739.

Network 740 is responsible for communicating data between processor 710, input/output system 720, and memory 730. Network 740 may, for example, include a number of different types of busses (e.g., serial and parallel).

In certain modes of operation, processor 710 is able to receive writes (e.g., from host system IO or from another storage system) and prepare them for storage managed by the computer system. Once stored, processor 710 may report their storage (e.g., to the host system IO or another storage system). Processor 710 can also trigger replications (e.g., synchronous or point-in-time copies) between various disks, which may be in its managed storage or in the managed storage of another computer system. The disks may be actual disks or representations of disks. Furthermore, processor 710 can determine if various replications need to be paused (e.g., if another site is no longer available). Moreover, processor 710 can determine how to resynchronize various disk (e.g., if another site becomes available). Processor 710 may, for example, accomplish this by implementing one or more parts of processes 300-600.

The terminology used herein is for the purpose of describing particular implementations only and is not intended to be limiting. As used herein, the singular form "a", "an", and "the" are intended to include the plural forms as well, unless the context clearly indicates otherwise. It will be further understood that the terms "comprises" and/or "comprising," when used in the this specification, specify the presence of stated features, integers, steps, operations, elements, and/or components, but do not preclude the presence or addition of one or more other features, integers, steps, operations, elements, components, and/or groups therefore.

The corresponding structure, materials, acts, and equivalents of all means or steps plus function elements in the claims below are intended to include any structure, material, or act for performing the function in combination with other claimed elements as specifically claimed. The description of the present implementations has been presented for purposes of illustration and description, but is not intended to be exhaustive or limited to the implementations in the form disclosed. Many modification and variations will be apparent to those of ordinary skill in the art without departing from the scope and spirit of the disclosure. The implementations were chosen and described in order to explain the principles of the disclosure and the practical application and to enable others or ordinary skill in the art to understand the disclosure for various implementations with various modifications as are suited to the particular use contemplated.

A number of implementations have been described for managing the remote replication of data, and several others have been mentioned or suggested. Moreover, those skilled in the art will readily recognize that a variety of additions, deletions, modifications, and substitutions may be made to these implementations while still achieving the remote replication of data. Thus, the scope of the protected subject matter should be judged based on the following claims, which may capture one or more concepts of one or more implementations.

The invention claimed is:
1. A method comprising:
 storing a first disk at a first site, the first disk storing input/output (I/O) data for a host system;

storing a first disk and a second disk at second site that is remote from the first site, the first disk of the second site being a synchronous replication of the first disk of the first site;

storing a first disk, a second disk, and a third disk at third site that is remote from the first site and the second site, the first disk of the third site being a synchronous replication of a second disk of the first site, and the third disk at the third site being a point-in-time copy of the first disk of the third site;

responsive to a loss of the second site, ceasing a trigger for point-in-time copy operations from the first disk of the third site to the third disk of the third site; and responsive to a return of the second site:
restarting synchronous replication operations from the first disk of the first site to the first disk of the second site; and
restarting the trigger for the point-in-time copy operations from the first disk of the third site to the third disk of the third site.

2. The method of claim 1, further comprising, responsive to the return of the second site, determining whether the first site is available.

3. The method of claim 1, further comprising, responsive to determining that a synchronization of the first disk of the first site with the first disk of the second site is complete, determining whether a replication of a second disk of the first site with the first disk of the third site is complete.

4. The method of claim 1, further comprising waiting to restart the trigger for the point-in-time copy operations from the first disk of the third site to the third disk of the third site until a replication of the second disk of the first site with the first disk of the third site is complete.

5. The method of claim 1, further comprising:
responsive to the return of the second site, determining whether the first site is available; and
responsive to determining that the first site is unavailable, resynchronizing the second site from the third site.

6. The method of claim 1, further comprising managing the second disk of the third site as a point-in-time copy of the first disk of the third site.

7. The method of claim 1, further comprising managing the second disk of the first site as a point-in-time copy of the first disk of the first site.

8. The method of claim 1, further comprising creating a synchronous replication of the second disk of the second site to the third disk of the third site.

* * * * *